No. 716,255. Patented Dec. 16, 1902.
S. R. LEONARD.
ANIMAL TRAP.
(Application filed Feb. 18, 1902.)
(No Model.)
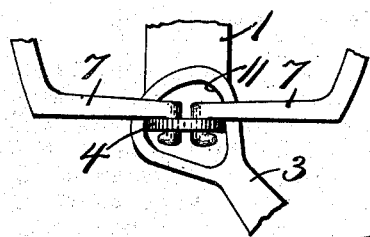
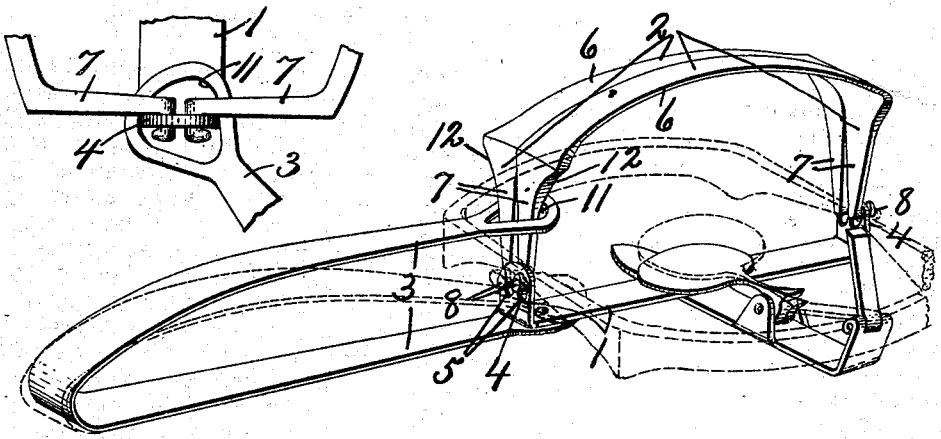
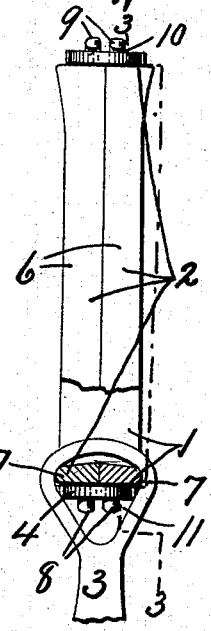
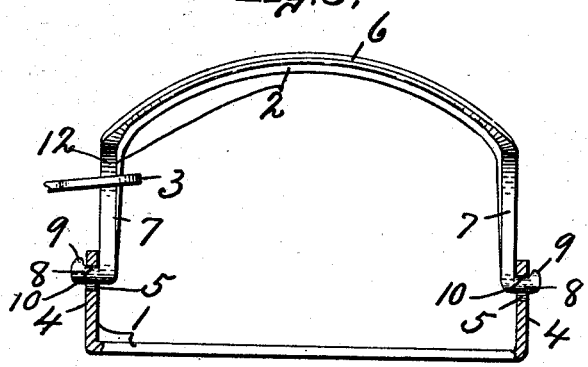
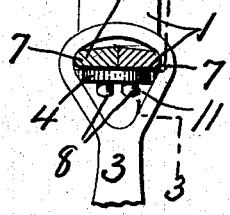
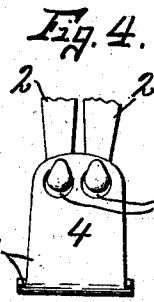
WITNESSES:
Wm T Brewer
H E Chace
INVENTOR
Stephen R. Leonard
BY
Smith & Denison
ATTORNEYS.
THE NORRIS PETERS CO., PHOTO-LITHO., WASHINGTON, D. C.

UNITED STATES PATENT OFFICE.

STEPHEN R. LEONARD, OF KENWOOD, NEW YORK, ASSIGNOR TO ONEIDA COMMUNITY, LTD., OF KENWOOD, NEW YORK.

ANIMAL-TRAP.

SPECIFICATION forming part of Letters Patent No. 716,255, dated December 16, 1902.

Application filed February 18, 1902. Serial No. 94,663. (No model.)

*To all whom it may concern:*

Be it known that I, STEPHEN R. LEONARD, of Kenwood, in the county of Madison, in the State of New York, have invented new and useful Improvements in Animal-Traps, of which the following, taken in connection with the accompanying drawings, is a full, clear, and exact description.

My invention relates to improvements in animal-traps, the object of which is to prevent undue displacement of the jaws from their pivotal bearings by the lateral swing of the spring or springs, and particularly when the trap is set, and at the same time to permit said jaws to be readily and easily assembled in position or removed therefrom without any further operation than the mere insertion of the pintles into or withdrawal from their respective openings in a manner hereinafter described.

To this end the invention consists in the construction and formation of the parts of a trap, as hereinafter fully described, and pointed out in the claims.

Referring to the drawings, Figure 1 is a perspective view of a closed trap embodying the features of my invention. Fig. 2 is a plan view of the detached supporting-frame and the jaws mounted thereon in their closed position, a portion of the spring for actuating said jaws being shown in its operative position. Fig. 3 is a sectional view taken on line 3 3, Fig. 2. Fig. 4 is an end view of the frame and adjacent ends of the jaws. Fig. 5 is a perspective view of one jaw. Fig. 6 is a plan view of one end of the trap, showing the jaws in their open position and the spring swung laterally.

Similar reference characters indicate corresponding parts in all the views.

In the use of traps of this character it has been found that when the jaws are set unless some provision has been made for holding their pintles in their bearings the operation of swinging the spring or springs laterally for the free approach of the animal to the trap causes said parts to engage each other with sufficient torsional strain to displace one or the other of the jaws from their pivotal bearings, and this also happens occasionally when the jaws are gripped or closed in trapping an animal and the spring exerting its full tension to hold the jaws in their closed position.

This of course renders the trap useless and frequently necessitates its return to the factory for repairs or for replacement by a new trap. In devising means to obviate this difficulty it is found to be expedient and even necessary to not only prevent undue displacement of the jaws while in use, but to construct the pintles and their bearings in such manner that the jaws may be readily assembled upon the supporting-frame or removed therefrom by simply springing the pintle ends of the jaws against their normal tension into and out of their respective openings or bearings.

It sometimes happens that after the parts of the trap are fully assembled in the factory the inspection reveals some imperfection in the material or construction or some particular part of the device which necessitates the removal of the jaws, and in order to carry out the objects of my invention to prevent the displacement of the jaws when in use and still to permit them to be easily and quickly removed or reinserted when desired I provide the pintles of the jaws with suitable lugs or shoulders, which are adapted to be readily passed through openings in the supporting-frame and serve to interlock with the adjacent portions of the supporting-frame when acted upon by the normal upward tension of the spring.

In the drawings I have shown a trap consisting of a supporting-frame 1, jaws 2, a spring 3, and means for holding the jaws against the action of the spring 3. The supporting-frame 1 is provided at its opposite ends with upturned arms 4, each of which is formed with a pair of openings or bearings 5, adapted to receive the pintles at the opposite ends of the jaws. Each of these jaws consists of an arched intermediate portion 6, having its opposite ends provided with depending arms 7, which terminate in outwardly-projecting pintles 8. These pintles are each formed with an upwardly-projecting lug or shoulder 9, extending above the upper surface of the pintle-bearing proper, substantially parallel with the arms 7 and separated therefrom to form grooves 10. The depth of the pintles through the lugs or shoulders 9 is substantially the same or slightly less than the diameter of their corresponding openings 5, so that they may be readily inserted into or withdrawn from said openings, and the arms 7 are tensioned to force the pintles through their respective openings from the inner sides of the ends 4, with the lugs or shoulders at the outer sides of said arms.

The spring 3 is preferably U-shaped, and the free ends of its arms and the frame 1 are connected in such manner as to swing laterally one upon the other, one of the arms operating to close the jaws, and is provided with an opening 11, adapted to receive one of the arms 4 when the jaws are opened, and the walls of said opening are adapted to have a sliding engagement with the lateral edges of the adjacent arms 7 to close the jaws when the spring is released. This upward sliding movement of the spring against the jaws tends to force the pintles against the upper sides of their bearings and to hold them in this position when said spring reaches the limit of its upward movement in engagement with flaring sides or edges 12 of the arms 7. It is therefore apparent that when the spring is acting on the jaws the lugs or shoulders 9 project beyond the sides of the openings, and when the spring or frame is swung laterally one upon the other and any torsional strain is brought to bear upon the arms 7 the lugs 9 engage the outer faces of the arms 4 and positively and effectively prevent the displacement of the jaws.

Although I have shown a means for holding the jaws in their open position, this forms no part of my present invention and is not necessary to herein illustrate or describe.

The operation of my invention will now be readily understood upon reference to the foregoing description and the accompanying drawings, and it will be noted that some change may be made in the form of the jaws and pintles and also the lugs without departing from the spirit thereof.

Having thus described my invention, what I claim, and desire to secure by Letters Patent, is—

1. An animal-trap comprising a support having openings, jaws having outwardly-projecting pintles arranged in the openings, a spring, and lugs on the outer ends of the pintles to engage the faces of the support and prevent inward displacement of the pintles from the opening.

2. A jaw for animal-traps, said jaw having depending arms adapted to yield under pressure, each arm having its lower end formed with an outwardly-projecting pintle formed with an upturned lug and a groove between the lug and arm.

3. An animal-trap comprising a support having upturned arms each provided with separate openings, jaws between the arms having pintles projecting outwardly through the openings, each pintle having a lug projecting in the direction of their arms above the upper walls of the opening, and a spring acting to close the jaws.

4. A jaw for animal-traps consisting of a U-shaped bar the arms of which are each provided with a pintle having a transverse groove in its upper face for the purpose set forth.

In witness whereof I have hereunto set my hand this 12th day of February, 1902.

STEPHEN R. LEONARD.

Witnesses:
S. S. ELDRIDGE,
S. F. SMITH.